United States Patent [19]
Morrison

[11] Patent Number: 4,877,104
[45] Date of Patent: Oct. 31, 1989

[54] BRAKING SYSTEM FOR A MOTORIZED DUMPING VEHICLE

[76] Inventor: Donald R. Morrison, 6228 Eagle Park Dr., Charlotte, N.C. 28214

[21] Appl. No.: 151,973

[22] Filed: Feb. 3, 1988

[51] Int. Cl.⁴ .............................................. B60K 17/14
[52] U.S. Cl. ...................................... 180/308; 60/466; 91/16; 91/441; 91/447; 91/451
[58] Field of Search .................. 180/305, 308; 60/460, 60/464, 466; 91/16, 18, 30, 32, 438, 441, 447, 451, DIG. 2

[56] References Cited

U.S. PATENT DOCUMENTS

| | | | |
|---|---|---|---|
| 3,672,167 | 6/1972 | Griesenbrock | 60/466 X |
| 4,102,425 | 7/1978 | Marsden et al. | 180/308 X |
| 4,185,713 | 1/1980 | Williams et al. | 180/308 X |
| 4,227,587 | 10/1980 | Carman | 180/305 X |

FOREIGN PATENT DOCUMENTS

| | | | |
|---|---|---|---|
| 0012902 | 7/1980 | European Pat. Off. | 180/308 |
| 0148654 | 11/1980 | Japan | 180/308 |
| 1299844 | 3/1987 | U.S.S.R. | 180/308 |

*Primary Examiner*—Robert J. Spar
*Assistant Examiner*—Janice Krizek
*Attorney, Agent, or Firm*—Olive & Olive

[57] ABSTRACT

A braking system for a dumping vehicle having a hydraulic drive system and a hydraulic dump container is disclosed. A two-section control valve is connected by conduit to a hydraulic fluid reservoir and a hydraulic motor. The control valve includes a first valve assembly for controlling the dump container and a second valve assembly for controlling operation and direction of the hydraulic motor. An anti-cavitation valve and relief valve are provided to prevent locking of the vehicle wheels during braking. Walk-behind, riding-step and riding-seat variations of the invention vehicle are disclosed.

3 Claims, 5 Drawing Sheets

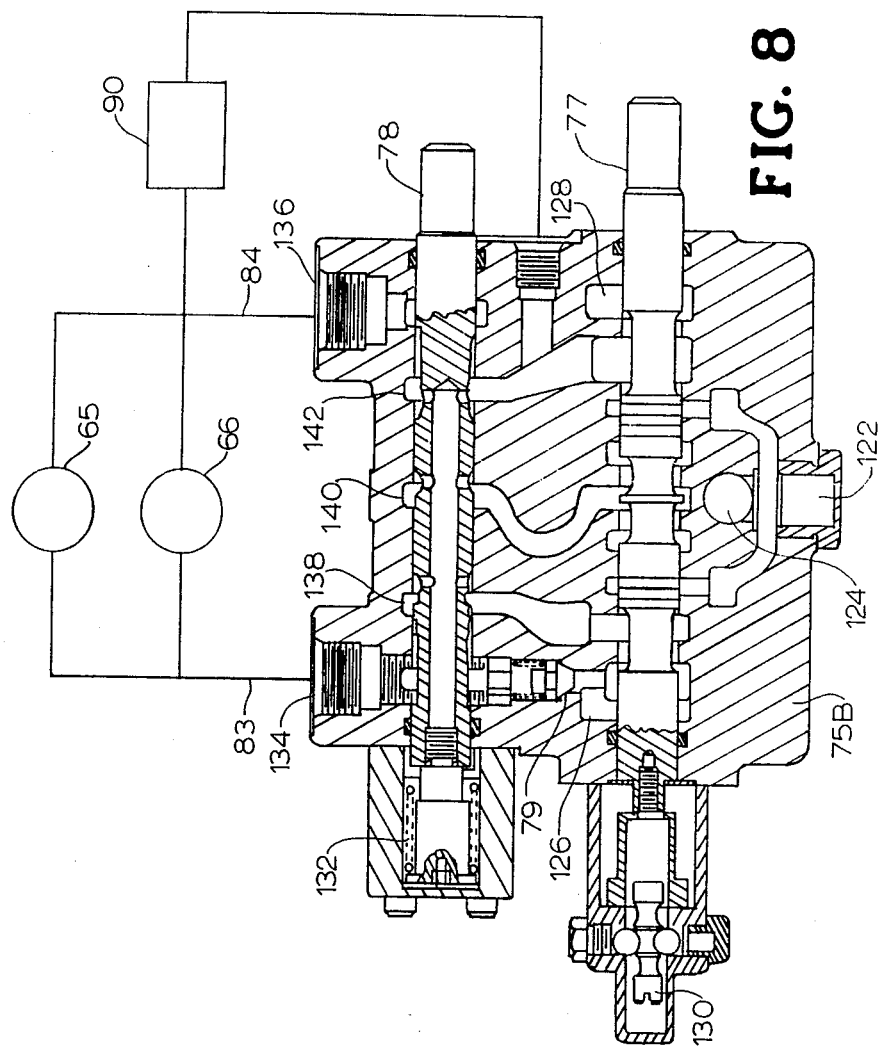

BRAKING SYSTEM FOR A MOTORIZED DUMPING VEHICLE

BACKGROUND OF THE INVENTION

1. Field of the Invention

The invention relates broadly to a hydraulic braking system, and more specifically to a motorized dumping vehicle having a load-carrying pan tipped by power-operated means and a braking system for gradual stops.

2. Description of the Related Art.

Concrete construction and other work requiring on-the-job transport of heavy materials from one location to another has brought about the development of a variety of relatively small, load-carrying vehicles capable of moving small but often very heavy loads of material on the job site. For example, a frequent need is to load a quantity of concrete at a first location, transport such concrete to a second location and then dump the contents for spreading and screeding operations at the second location. In concrete work such vehicles are often referred to as a "concrete buggy". They may also be referred to as a dump truck or power-driven wheelbarrow. Some of such vehicles are of the walk-behind type while others are of the step or seat-riding type. The load which is carried by a container, called a "skip", "hopper", "pan", or "dump box", is conventionally raised and lowered by a hydraulic piston as in U.S. Pat. Nos. 2,424,670 or 2,427,132. A front pair of single or dual wheels is conventionally driven by a differential and transmission as in U.S. Pat. No. 2,427,132. In the three-wheel-type vehicle, a single or dual wheel supports the rear of the vehicle and is adapted for rotating around a vertical axis for the purpose of steering the vehicle, sometimes with use of a steering mechanism as in U.S. Pat. No. 2,427,132. The conventional way of braking the vehicle is by use of mechanical brakes as illustrated in U.S. Pat. Nos. 2,427,132 and 2,530,574.

My prior U.S. Pat. No. 4,645,264, discloses a motorized dumping vehicle for concrete. In particular, the three-wheel-type dumping vehicle therein disclosed includes a hydraulic drive system for the front wheels with means in the hydraulic system enabling the front wheels to act as brakes and also with means whereby the hydraulic fluid can be cooled within a reservoir which acts both as a structural frame member and as a uniquely-arranged heat sink in which the concrete or other relatively-cool material being transported is used to absorb heat from the hydraulic fluid. This dumping vehicle also includes an improved hydraulic system enabling both the dump box as well as the front wheels to be hydraulically operated and with a minimum requirement of horsepower in the gasoline engine used as the prime source of power for the vehicle.

The art continues to seek improvements. In particular, it is desirable that a braking system bring a dumping vehicle to a gradual stop. If a dumping vehicle stops suddenly or if the braking system locks the wheels of a vehicle, the vehicle is likely to flip or roll, particularly when it is carrying a load. Also, a sudden stop can cause the contents in the pan to spill. Furthermore, a dumping vehicle is likely to slide, particularly when traveling downhill, if the wheels lock during braking.

The present invention seeks to improve upon the dumping vehicle described in the aforementioned U.S. Pat. No. 4,645,264 by providing it with a braking system for gradual stops, thereby reducing the possibility of tipping or rolling because of locked wheels or a sudden stop. Other objects of the present invention will become apparent as the description proceeds.

SUMMARY OF THE INVENTION

The present invention includes a braking system for a hydraulic dumping vehicle. The braking system gradually stops the dumping vehicle and prevents the vehicle wheels from locking, thereby reducing the possibility that the vehicle will tip or roll during braking.

In a broad aspect, the present invention relates to a hydraulic braking system comprising a source of hydraulic fluid joined to a flow circuit comprising an anti-cavitation valve, a hydraulic motor, and a pressure relief valve, in series. The anti-cavitation valve and pressure relief valve in this circuit are each also joined in branched flow relationship with the hydraulic fluid source, such that excess pressure in the circuit experienced by the pressure relief valve results in flowing hydraulic fluid through the pressure relief valve back to the hydraulic fluid source, and concurrently any local under-pressure (vacuum) in the circuit experienced by the anti-cavitation valve causes flow of hydraulic fluid from the hydraulic fluid source into the flow circuit.

The braking system of the present invention is usefully employed in a dumping vehicle having a hydraulic drive system and a hydraulic dump container. A two-section control valve is connected by conduit to a hydraulic fluid reservoir and a hydraulic motor. The control valve includes a first valve assembly for controlling the dump container and a second valve assembly for controlling operation and direction of the hydraulic motor. An anti-cavitation valve and relief valve are provided to prevent locking of the vehicle wheels during braking. Walk-behind, riding-step and riding-seat variations of the invention vehicle are disclosed.

BRIEF DESCRIPTION OF THE DRAWINGS

FIG. 8 is an enlarged sectional view of the two-section control valve of the present braking system.

DETAILED DESCRIPTION OF THE PREFERRED EMBODIMENT

Making reference initially to FIGS. 1–4 and FIG. 7, the invention vehicle 10 comprises a rectangular metal-formed chassis 12 mounting a small, e.g., seven and one-half horsepower, gasoline engine 15 at its rear end and a dump box (load container) 18 at its front end.

The dump box may for example be formed of metal, or alternatively it may be constructed of a suitable polymeric material, e.g., polyurethane or polyethylene, optionally containing suitable reinforcing fibers such as glass or metal fibers, as desired or necessary to provide the box with adequate strength for carrying heavy loads. Any other suitable materials of construction may likewise be employed.

Figure 1:
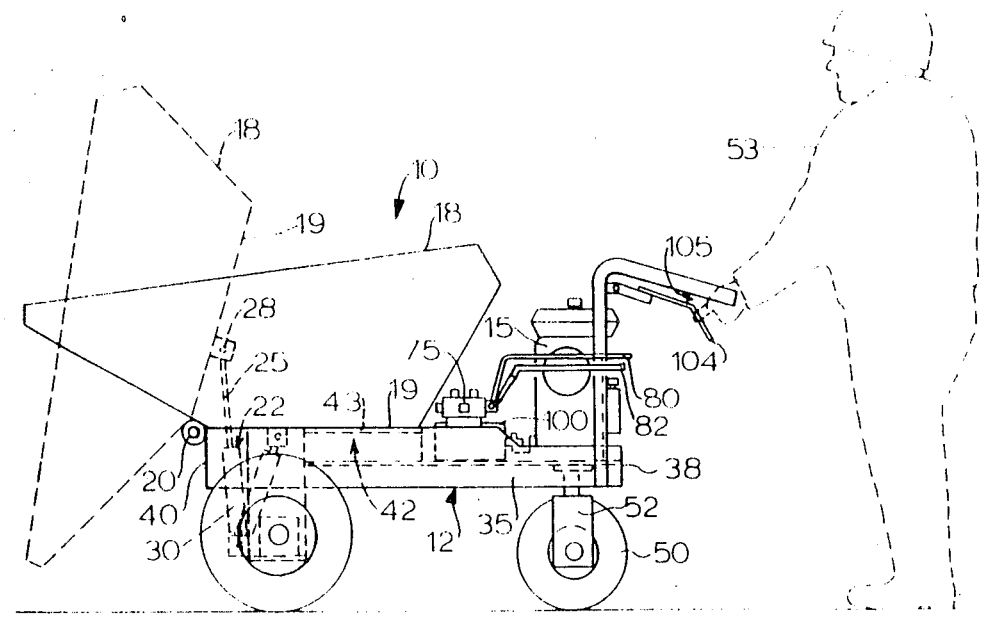
FIG. 1 is a side elevation view of a motorized dumping vehicle according to a first embodiment of the invention with the dump box indicated in solid lines in a transport position and in dashed lines in a dumping position and a typical operator also depicted in dashed lines.
Figure 2:
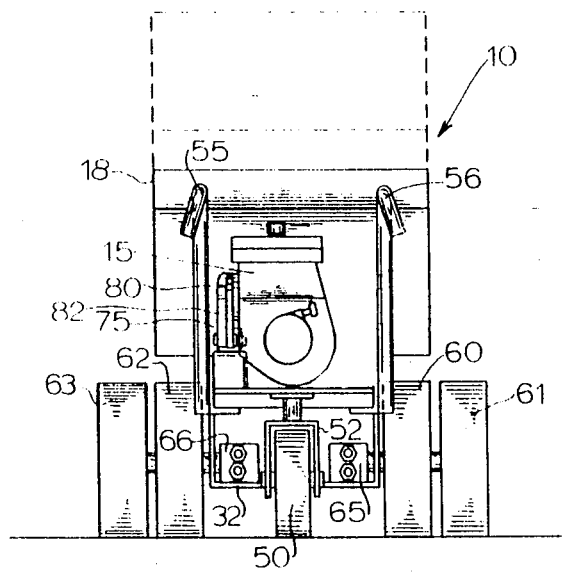
FIG. 2 is a rear elevation view of the vehicle of FIG. 1.
Figure 3:
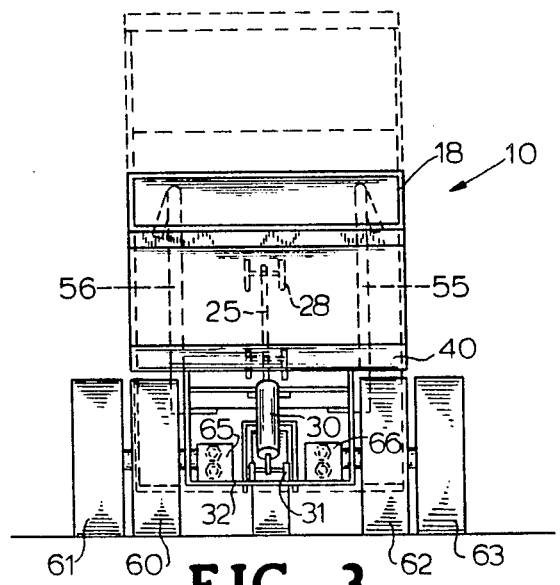
FIG. 3 is a front elevation view of the vehicle of FIG. 1.

Dump box 18 has a suitable pivotal mount 20 and is raised and lowered by hydraulic piston/cylinder 22 by means of rod 25 pivotally connected to bracket 28 on the bottom wall of dump box 18 and cylinder 30 pivotally connected on bracket 31 mounted on bar 32 (FIG. 3).

Chassis 12 is made up of side frame members 35, 36 and end frame members 38, 40. Although shown as having a rectangular configuration, the chassis may have a U-shape or other suitable structure. An oil reservoir tank 42 extends between and is welded to the metal side frame members 35, 36. Tank 42 forms a structural part of chassis 12. Further, the top wall 43 of tank 42 is located immediately below the bottom wall surface 19 of dump box 18 when in transport position. Heat in tank 42 can thus be transmitted from the tank to the chassis, whereby the chassis serves as a heat sink to dissipate heat from the oil in the tank. Further heat dissipation capacity may also be provided by transfer of heat from the top wall 43 to the bottom wall surface 19 of the dump box, with the top wall 43 and bottom wall surface 19 in abutting contact with one another, or else closely positioned to one another with a small space (air gap) therebetween. In practice, the chassis has been determined to generally provide adequate heat dissipation capacity for the heat contained in the oil in tank 42.

When the dump box is employed for heat dissipation, relatively cool concrete placed in the dump box acts as a further heat sink for removing heat from oil stored in reservoir tank 42.

Since substantial heat develops in the hydraulic system of the invention, particularly when the vehicle 10 is carrying relatively heavy loads, climbing a steep incline, or the like, the reservoir tank 42 serves the normal purpose of an oil reservoir as well as comprising a structural part of the vehicle chassis. In this manner, the chassis and, if desired, the dump box itself and the material being transported, can be used to absorb heat stored in the hydraulic fluid passing through the reservoir.

It will be apparent from the foregoing that the chassis 12 and oil reservoir tank 42 may suitably be formed of any satisfactory thermally conductive material to effect the aforementioned heat transfer. Exemplary materials of construction may thus include high strength polymeric materials, ceramics, composites, and metals, with metals generally being preferred.

Chassis 12 is supported in the rear by a single wheel 50 having a pivotal mount 52 enabling the operator 53 to steer by use of the handles 55, 56 swiveling wheel 50 on its vertical axis to change the direction of travel of vehicle 10. The front of chassis 12 is supported by two sets of dual wheels 60, 61 and 62, 63 to provide increased load carrying wheel surface as compared to use of single wheels in the normal three-wheel type vehicle. Thus, while single front wheels could be substituted for the illustrated dual wheel arrangement on the front of chassis 12, vehicle 10 provides, in effect, a three-wheel-type vehicle with increased load-bearing wheel surface.

Wheels 60, 61 are driven by hydraulic motor 65 mounted on support bar 32 and wheels 62, 63 are driven by hydraulic motor 66, also mounted on support bar 32 beneath chassis 12. Thus, another important and unique feature of the invention is to drive the vehicle 10 by means of front wheels which are individually hydraulically powered by separate hydraulic motors, a feature offering numerous advantages particularly when transporting, reversing and braking heavy loads in industrial applications.

Figure 7:
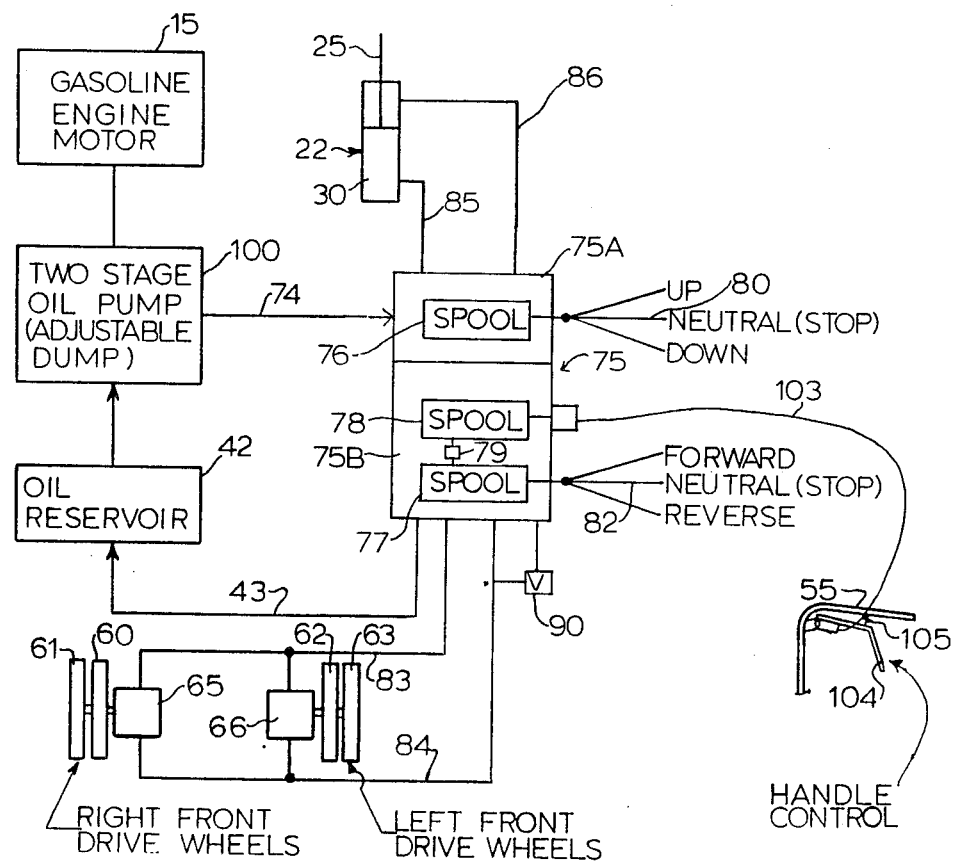
FIG. 7 is a schematic diagram of the hydraulic system employed with the vehicle. For clarity of illustration, the hydraulic conduits illustrated in FIG. 7 are not shown in the other figures.
Figure 4:
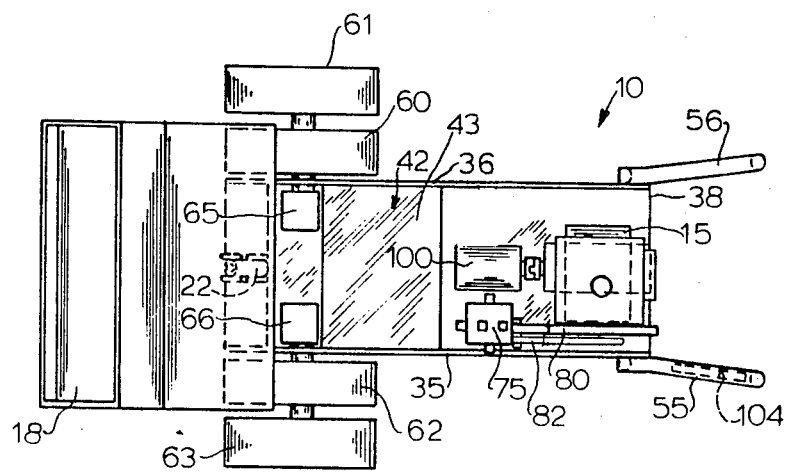
FIG. 4 is a plan view of the vehicle of FIG. 1 with the dump box raised to illustrate the location of the reservoir and other hydraulic system components.

As illustrated in the schematic view of FIG. 7 and in the sectional view of FIG. 8, a two-section control valve 75 is provided to control hydraulic piston/cylinder 22 and hydraulic motors 65,66. Control valve 75 includes a first section 75A having a first spool 76 and a second section 75B having a second spool 77, a third spool 78, and an anti-cavitation valve 79 in communication between spools 77 and 78. Spool 78 is of the type having a spring return to a neutral position.

With particular reference to FIG. 8, section 75B of the two section valve is positioned frontally of the spring loaded first section (not shown), with conduit 83 joined to working port 134 and conduit 84 joined to working port 136. The second valve section 75B features a power core 122 with an oil inlet 124 communicating with the oil flow passageways 138, 140, and 142. The second valve section also comprises tank cores 126 and 128, for returning oil from this valve section to the oil reservoir (not shown). Second spool 77 has associated therewith a detent structure 130, while spring 132 biases third spool 78 to the "in" position.

Gasoline engine 15 drives a two-stage oil pump 100 with an adjustable dump such as employed in log splitters wherein the volume of oil pumped and the system pressure automatically varies as the load varies thereby enabling a relatively small gasoline engine to be employed for hauling relatively heavy loads. A Delta pump is one such pump in which under heavy load fluid volume is reduced and pressure is increased and under light load fluid volume increases and pressure decreases. The output of pump 100 is fed entirely to control valve 75 through conduit 74. From the control valve most of the fluid is selectively diverted through conduits 83, 84 to motors 65,66 or through conduits 85, 86 to one side or the other of piston/cylinder 22. Conduit 43 provides a return line from control valve 75 to reservoir tank 42.

Spool 76 is actuated by lever 80 to control piston/cylinder 22. The piston/cylinder 22 can be selectively actuated for up, neutral (stop), and down positions.

Spool 77 is actuated by lever 82 and determines the forward, neutral and reverse positions of the motors 65,66. Spool 78 controls the stop and go movement of motors 65, 66 and is activated by control cable 103 and pivoted handle 104 loaded by spring 105 and mounted on handle 55. The movement of vehicle 10 is thus controlled by spools 77 and 78. Hydraulic fluid flows from pump 100 through control valve 75 and back to reservoir tank 42 when spool 77 is in the neutral position. When spool 77 is moved to either the forward or the reverse position, hydraulic fluid flows to spool 78. When spool 78 is in the "in" position (i.e. not pulled "out" by depressing handle 104), hydraulic fluid flows through spool 78 and is returned to the reservoir tank 42. When spool 78 is in the "out" position (i.e. pulled "out" as handle 104 is depressed), hydraulic fluid is directed to motors 65, 66 to drive wheels 60,61 and 62,63, respectively. When an operator releases handle 104, spool 78 returns to the "in" position, thereby stopping the flow of fluid to motors 65,66 and diverting the fluid from control valve 75 to the reservoir tank 42. Under such conditions, hydraulic fluid remaining in conduits 83,84 is utilized for braking the vehicle 10. If high fluid pressure builds up in conduits 83,84 due to turning of wheels 60,61 and 62,63, such pressure is relieved through relief valve 90 to prevent wheel lock-up. Any fluid relieved through relief valve 90 is simultaneously replaced by fluid passing through anti-cavitation valve 79, thereby permitting wheels 60, 61 and 62,62 to come to a gradual stop. The anti-cavitation valve 79 is set at a predetermined low pressure, whereby under suction conditions the valve opens to relieve differential internal pressure.

In operation, an operator 53 selects either the forward or reverse position of spool 77. As handle 104 is depressed to actuate spool 78, fluid passes to motors 65,66 to drive wheels 60,61 and 62,63. When the handle 104 is released, fluid flow to motors 65,66 ceases. Anti-cavitation valve 79 permits fluid to pass to conduits 83,84 to provide a smooth and gradual stop of vehicle 10. Relief valve 90 is a brake-cushioning valve which prevents the vehicle wheels 60,61 and 62,63 from locking, thereby reducing the possibility of a turn-over of vehicle 10 during braking.

Referring specifically to FIG. 8, when spool 78 is in the "in" position, the working ports 134 and 136 are blocked by the spool. If the vehicle, while being driven in the forward direction with spool 77 in the forward position and spool 78 out, is suddenly stopped by raising handle 104 and moving spool 78 to the in position, the working ports 134 and 136 become blocked, but the hydraulic motors 65 and 66 keep turning due to forward inertia. This continuing hydraulic motor movement causes the motors to function as pumps in the hydraulic system, creating pressure in the system which is relieved by the brake-cushioning relief valve 90 to prevent sudden locking of the wheels while the anti-cavitation valve 79 resolves differential pressure within valve section 75B.

Depending on whether conduit 83 or conduit 84 "gets the pressure," i.e., depending on whether spool 77 is in the forward or reverse position when spool 78 is in the out position, the hydraulic motors 65, 66 will rotate in one direction or the other. For example, if working port 134 is selectively pressurized to flow hydraulic fluid into conduit 83, the vehicle goes forward.

Thus, if spool 77 is pushed into the forward postion, and spool 78 is pulled out, the vehicle will be driven forward. When spool 77 is pulled out to the reverse position, hydraulic fluid passes upwardly to the hollow spool 78, but nothing occurs while the top spool 78 is in the in position; if spool 78 is then pulled out, the vehicle will be driven backwards. When the spool 77 is in the neutral (stop) position, there is internal recirculation of the hydraulic fluid, e.g., oil, only in the vicinity of spool 77; no hydraulic fluid passes upwardly through the various oil flow passageways to the spool 78.

Figure 5:
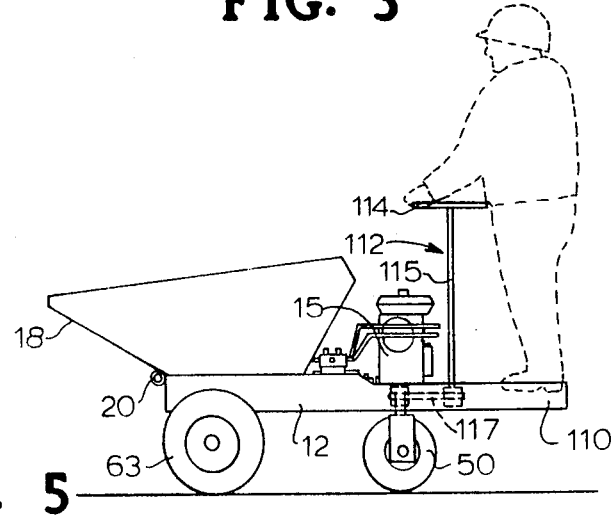
FIG. 5 is a side elevation view of the vehicle of FIG. 1 modified in a second embodiment as a step-riding-type vehicle with the operator depicted in dashed lines.
Figure 6:
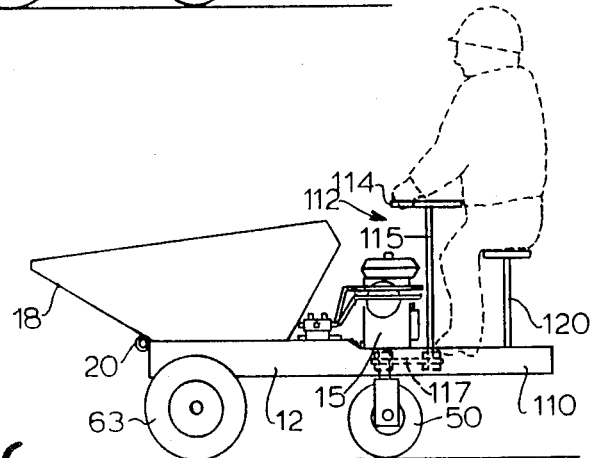
FIG. 6 is a side elevation view of the vehicle of FIG. 1 modified in a third embodiment as a riding-seat-type vehicle with the operator shown in dashed lines.

The invention vehicle 10 readily adapts to the riding-step-type vehicle as illustrated in FIG. 5 wherein there has been added a step platform 110 secured to chassis 12 and a conventional steering mechanism 112 having a steering wheel 114, a steering rod 115 and steering connection 117 suitably connected to pivot rear wheel 50. The invention also readily adapts to the seat-riding-type vehicle as shown in FIG. 6 wherein there has been added the seat 120 to the FIG. 6 construction.

Figure 9:
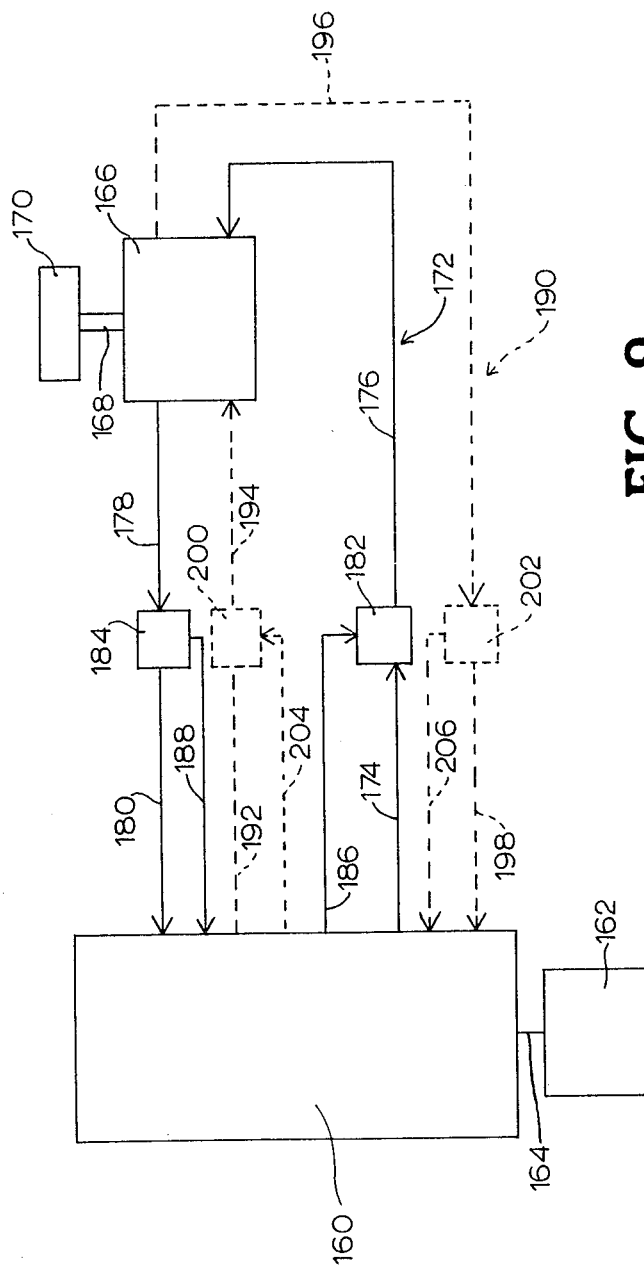
FIG. 9 is a simplified schematic diagram of a hydraulic system according to a broad aspect of the invention.

Referring now to FIG. 9, there is shown a simplified schematic diagram of a hydraulic braking system according to the present invention, in generalized form. In addition to the specific application of the hydraulic system to motorized dump-type vehicles, as previously described hereinabove, the hydraulic braking system of the invention may be utilized for a variety of other hydraulic systems applications, wherein braking of a hydraulic motor is required. Examples of such other applications include motive vehicles such as golf carts, three-wheeled recreational vehicles, and fork-lifts, as well as industrial processing systems utilizing hydraulic motors, such as lay-down systems for forming nonwoven fabrics, hydraulically powered looms, hydraulic conveyor systems, etc.

The hydraulic braking system shown in FIG. 9 comprises a hydraulic fluid source 160 which is selectively controllable by control means 162 joined to fluid source 160 by control signal line 164.

The hydraulic fluid source 160 may comprise an oil reservoir or other supply of hydraulic fluid, with the selective control means 162 being operable to initiate or shut off flow of hydraulic fluid from the hydraulic fluid source 160 into hydraulic flow circuit 172, for actuation of hydraulic motor 166. The hydraulic motor 166 comprises an output drive shaft 168, which may be coupled to a driven wheel 170, or other motive power-receiving structure or elements.

The hydraulic flow circuit 172 comprises flow conduits 174, 176, 178, and 180. Joined in series in this flow circuit are anti-cavitation valve 182, hydraulic motor 166, and pressure relief valve 184. In this series arrangement, anti-cavitation valve 182 is located upstream of the hydraulic motor 166, while pressure relief valve 184 is located downstream from the hydraulic motor.

The anti-cavitation valve 182 is further joined by branch conduit 186 in flow communication with hydraulic fluid source 160. Pressure relief valve 184 is likewise joined by a branch conduit 188 to the hydraulic fluid source 160.

Branch lines 186 and 188, respectively joining the anti-cavitation valve 182 and pressure relief valve 184 with the hydraulic fluid source 160, do not effect any flow of hydraulic fluid during normal operation of the hydraulic motor, but are actuated when the control means 162 is operated to shut off hydraulic fluid flow from source 160 to the hydraulic flow circuit 172.

Upon shut off of the oil flow from the source 160 through the flow circuit 172, the hydraulic motor 166 continues to draw hydraulic fluid from conduit 176 and to discharge fluid to conduit 178. When the pressure of the hydraulic fluid in conduit 178 reaches a selected value, the valve opens to release hydraulic fluid into branch conduit 188, for return to hydraulic fluid source 160, concurrently with flow of hydraulic fluid to the hydraulic fluid source through conduit 180.

At the same time, the pumping action of hydraulic motor 166 in drawing hydraulic fluid from conduit 176 will result in suction or under-pressure being created in such conduit. When the suction level reaches a predetermined value, the anti-cavitation valve 182 opens to flow hydraulic fluid from hydraulic fluid source 160 via branch conduit 186 into conduit 176 of the flow circuit 172, to equalize pressure in the hydraulic flow circuit. As a result, cavitation is prevented, as the driven wheel 170 is gradually braked to a stop.

The hydraulic braking system of FIG. 9 has been described above with reference to a hydraulic flow circuit providing for rotation of the driven wheel 170 by the hydraulic motor 166 in a first given direction. If only unidirectional movement of the driven wheel 170 is required, then the system previously described is satisfactory for such purpose.

In many applications, however, such as vehicular applications, it is desirable to power the hydraulic motor 166 such that the driven wheel 170 may be rotated in either direction, i.e., clockwise or counterclockwise. For such bi-directional driven movement, it may be desirable to employ a second hydraulic flow circuit, such as is shown in dotted-line representation in FIG. 9, together with the associated valve elements described below.

Referring now to the hydraulic braking system elements shown in dotted-line representation in FIG. 9, there is provided a second hydraulic flow circuit 190 comprising conduits 192, 194, 196, and 198. In this second hydraulic flow circuit there are provided a second anti-cavitation valve 200, joined via branch conduit 204 to hydraulic fluid source 160, and a second pressure relief valve 202, joined via branch conduit 206 to the hydraulic fluid source 160.

The operation of the second hydraulic flow circuit and associated elements is the same as previously described for the first hydraulic flow circuit. By this provision of a dual circuit arrangement, the hydraulic motor 166 may be selectively activated by means of the controller 162 to flow hydraulic fluid into either the first hydraulic flow circuit 172, or alternately into the second hydraulic flow circuit 190. The anti-cavitation valve 200 and pressure relief valve 202 in the second flow circuit function analogously to the corresponding anti-cavitation valve 182 and pressure relief valve 184 previously described for the first hydraulic fluid flow circuit.

Although the present invention has been described with reference to preferred embodiments, persons skilled in the art will recognize that changes may be made in form and detail without departing from the spirit and scope of the invention.

What is claimed is:

1. A hydraulic braking system, comprising:
    (a) a hydraulic fluid source;
    (b) a hydraulic fluid flow circuit coupled to said hydraulic fluid source for flow of hydraulic fluid therethrough;
    (c) an anti-cavitation valve, a hydraulic motor, and a pressure relief valve disposed in said flow circuit, in series relationship with one another, and with said hydraulic motor disposed in said circuit between said ant-cavitation valve and said pressure relief valve;
    (d) a branch conduit joining said hydraulic fluid source with said anti-cavitation valve;
    (e) a second branch conduit joining said hydraulic fluid source with said pressure relief valve;
    (f) means for selectively flowing hydraulic fluid through said flow circuit and said anti-cavitation valve, said hydraulic motor, and said pressure relief valve in sequence, and for terminating the flow of hydraulic fluid from said hydraulic fluid source through said flow circuit; and
    (g) a second hydraulic fluid flow circuit having disposed therein in series relationship a second anti-cavitation valve, and a second pressure relief valve, said hydraulic motor being disposed in said second hydraulic fluid flow circuit between said second anti-cavitation valve and said second pressure relief valve, whereby said hydraulic motor may be selectively driven in opposite directions by hydraulic fluid flow through a selected one of said first and second flow circuits, and with means for selectively flowing said hydraulic fluid from said hydraulic fluid source through a selected one of said first and second flow circuits.

2. A hydraulic braking system according to claim 1, wherein said hydraulic motor is coupled with a wheel driveable thereby.

3. A hydraulic braking system according to claim 1 wherein said hydraulic motor comprises one of a pair of hydraulic motors each of which is coupled to a wheel driveable thereby and operatively associated with a hydraulically driven vehicle.

* * * * *